(12) United States Patent
Lee et al.

(10) Patent No.: US 12,304,239 B2
(45) Date of Patent: May 20, 2025

(54) VEHICLE WHEEL HAVING ADJUSTABLE INSERT NECK AND METHOD FOR MANUFACTURING THE SAME

(71) Applicants: HYUNDAI MOTOR COMPANY, Seoul (KR); KIA CORPORATION, Seoul (KR); HYUNDAI SUNGWOO CASTING CO., LTD., Seoul (KR)

(72) Inventors: Jun Min Lee, Seoul (KR); Young Chan Kim, Yongin-si (KR); Min Soo Kim, Seoul (KR); Young Rae Jo, Seoul (KR); Young Il Kim, Chungju-si (KR); Sang Bum Park, Chungju-si (KR); Chang Hak Yoo, Chungju-si (KR)

(73) Assignees: Hyundai Motor Company, Seoul (KR); Kia Corpration, Seoul (KR); Hyundai Sungwoo Casting Co., Ltd., Seoul (KR)

( * ) Notice: Subject to any disclaimer, the term of this patent is extended or adjusted under 35 U.S.C. 154(b) by 0 days.

(21) Appl. No.: 18/396,250

(22) Filed: Dec. 26, 2023

(65) Prior Publication Data
US 2024/0123760 A1 Apr. 18, 2024

Related U.S. Application Data

(62) Division of application No. 17/038,668, filed on Sep. 30, 2020, now Pat. No. 11,897,285.

(30) Foreign Application Priority Data

May 29, 2020 (KR) .................. 10-2020-0065276

(51) Int. Cl.
*B60B 3/02* (2006.01)
*B21D 53/30* (2006.01)
(Continued)

(52) U.S. Cl.
CPC .............. *B60B 3/02* (2013.01); *B21D 53/30* (2013.01); *B23K 20/122* (2013.01); *B60B 3/06* (2013.01);
(Continued)

(58) Field of Classification Search
CPC .............. B21D 53/30; B23K 20/122; B23K 2101/006; B60B 21/025;
(Continued)

(56) References Cited

U.S. PATENT DOCUMENTS 6,769,743 B1 8/2004 Aasen
9,090,128 B2 * 7/2015 Zhu .............. B60C 19/002
(Continued)

FOREIGN PATENT DOCUMENTS

CN 103269873 A 8/2013
EP 2679405 A1 * 1/2014 ......... B21D 53/264
(Continued)

OTHER PUBLICATIONS

U.S. Notice of Allowance dated Nov. 2, 2023 issued in U.S. Appl. No. 17/038,668.
(Continued)

*Primary Examiner* — Bayan Salone
(74) *Attorney, Agent, or Firm* — Morgan Lewis & Bockius LLP

(57) ABSTRACT

A method for manufacturing a vehicle wheel includes: a casting process of manufacturing the wheel in a one-piece body having a forming end and a temporary flange protruding at inner and outer sides of the wheel, respectively, wherein the one-piece body further includes a resonance chamber forming groove; a primary shape machining process of forming a stepped part at an outer circumferential side of the resonance chamber forming groove; a flow forming process of bending the forming end to be seated on
(Continued)

- UNDERCUT FITTING - the stepped part; a friction stir welding process of integrally bonding a portion where the forming end and the stepped part are in close contact with each other; a fine machining process of removing the temporary flange; and a sound-absorbing hole machining process of forming a sound-absorbing hole for communicating between the resonance chamber and an interior space of a tire in the forming end.

2 Claims, 7 Drawing Sheets

(51) Int. Cl.
  *B23K 20/12* (2006.01)
  *B60B 3/06* (2006.01)
  *B60B 21/02* (2006.01)
  *B23K 101/00* (2006.01)

(52) U.S. Cl.
  CPC ...... *B60B 21/025* (2013.01); *B23K 2101/006* (2018.08); *B60B 2310/202* (2013.01); *B60B 2310/211* (2013.01); *B60B 2310/228* (2013.01); *B60B 2310/3025* (2013.01); *B60B 2360/10* (2013.01); *B60B 2900/111* (2013.01); *B60B 2900/112* (2013.01); *B60B 2900/113* (2013.01); *B60B 2900/116* (2013.01); *B60B 2900/133* (2013.01)

(58) Field of Classification Search
  CPC ....... B60B 2310/3025; B60B 2900/113; B60B 2900/116; B60B 2900/133; B60B 3/02; B60B 3/06; B60B 2310/202; B60B 2310/211; B60B 2310/228; B60B 2360/10; B60B 2900/111; B60B 2900/112
  See application file for complete search history.

(56) References Cited

U.S. PATENT DOCUMENTS

| | | | |
|---|---|---|---|
| 9,333,552 B2 * | 5/2016 | Furukawa | ............. B60B 21/104 |
| 2013/0239411 A1 | 9/2013 | Furukawa et al. | |
| 2015/0047920 A1 * | 2/2015 | Zhu | ........................ B60C 19/002 |
| | | | 29/894.31 |
| 2020/0346487 A1 * | 11/2020 | Nelson | ...................... B60B 1/06 |

FOREIGN PATENT DOCUMENTS

| | | | | |
|---|---|---|---|---|
| GB | 2081625 A | | 2/1982 | |
| JP | 4988074 B1 * | | 8/2012 | ........... B21D 53/264 |
| JP | 2019209762 A * | | 12/2019 | ............. B60B 21/02 |
| KR | 10-2016-0065521 A | | 6/2016 | |
| KR | 10-2016-0065523 A | | 6/2016 | |
| KR | 10-2016-0065526 A | | 6/2016 | |
| KR | 101651986 B1 * | | 8/2016 | ............. B60B 21/02 |
| KR | 10-1665318 B1 | | 10/2016 | |
| KR | 10-1671777 B1 | | 11/2016 | |
| KR | 101671779 B1 * | | 11/2016 | ............. B23K 20/12 |
| KR | 10-1729172 B1 | | 4/2017 | |
| KR | 101737503 B1 * | | 5/2017 | ........... B21D 53/264 |
| KR | 10-1977678 B1 | | 5/2019 | |

OTHER PUBLICATIONS

U.S. Office Action dated Jun. 22, 2023 issued in U.S. Appl. No. 17/038,668.

* cited by examiner

[FIG. 1A]
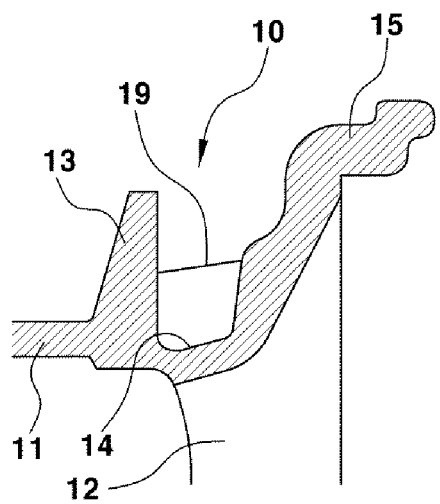
- CASTING -
[FIG. 1B]
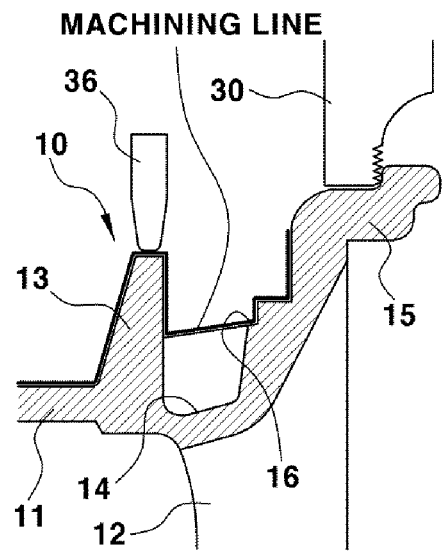
- PRIMARY SHAPE MACHINING -

[FIG. 1C]
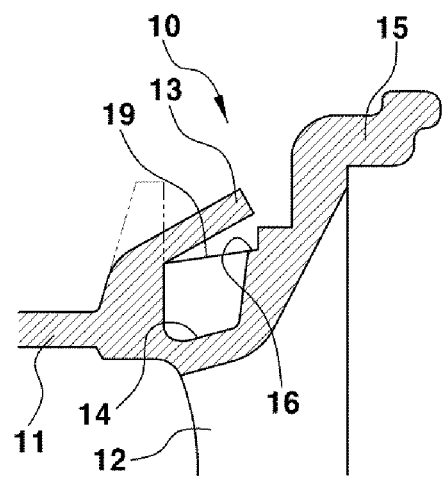
- FLOW FORMING -
[FIG. 1D]
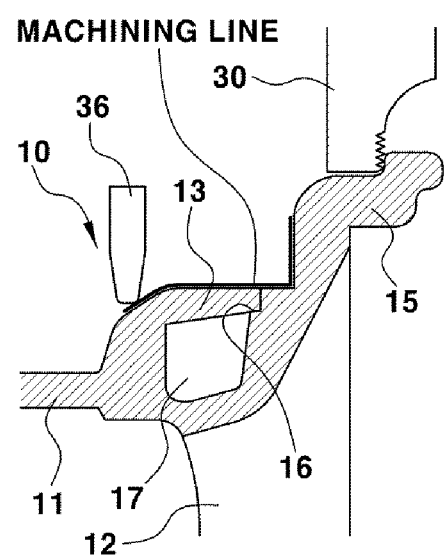
- SECONDARY SHAPE MACHINING -

[FIG. 1E]
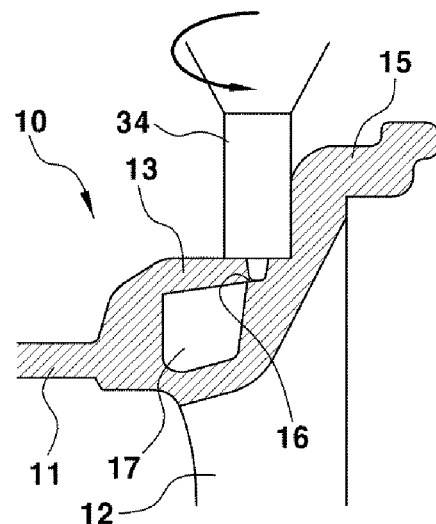
- FRICTION STIR WELDING -
[FIG. 1F]
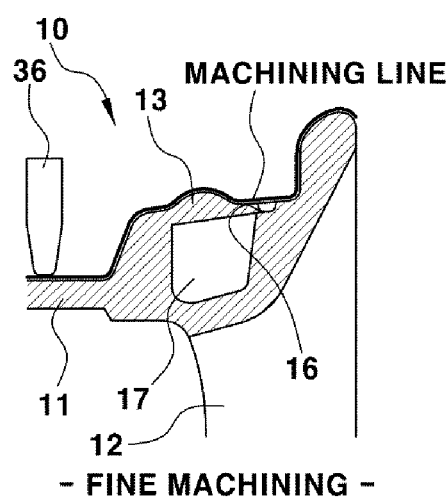
- FINE MACHINING -

[FIG. 1G]
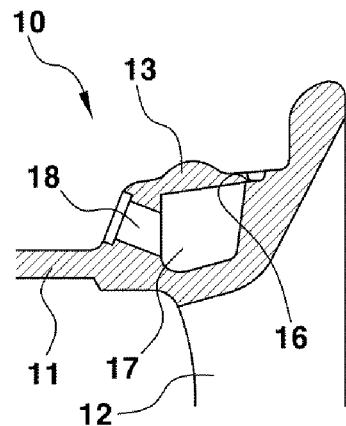
- SOUND-ABSORBING HOLE MACHINING -
[FIG. 2]
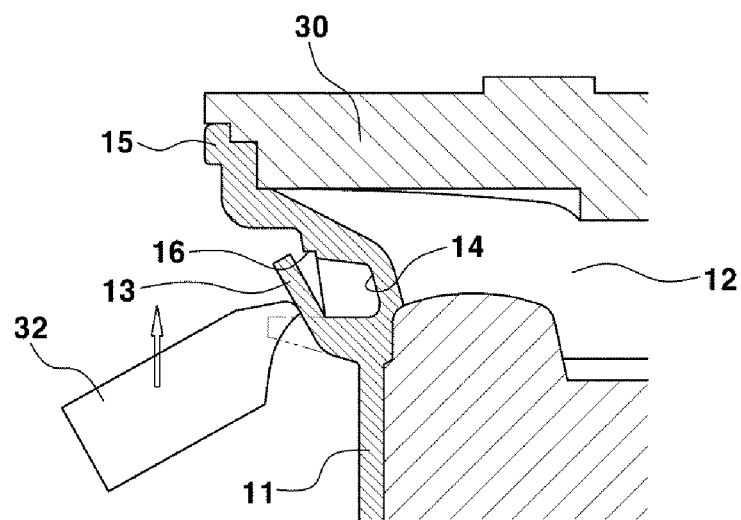

[FIG. 3]
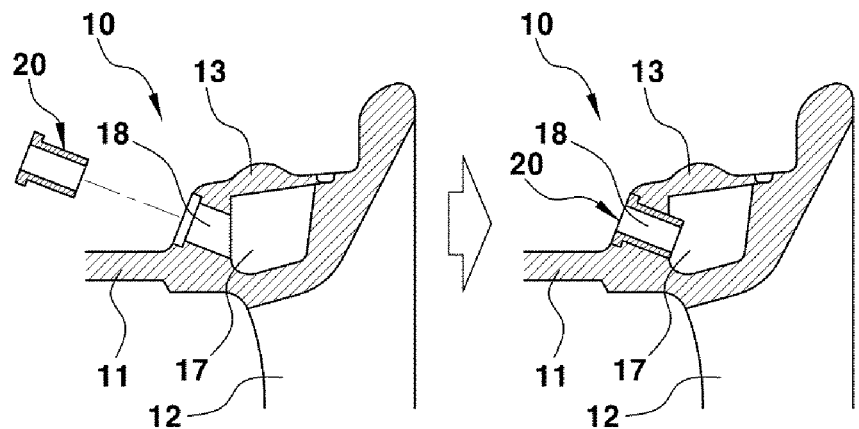
- FORCIBLY FITTING OR BONDING -
[FIG. 4]
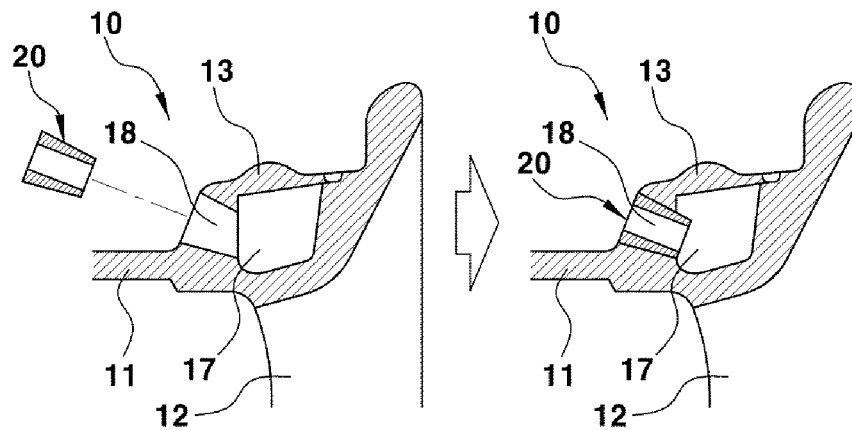
- FORCIBLY FITTING -

[FIG. 5]
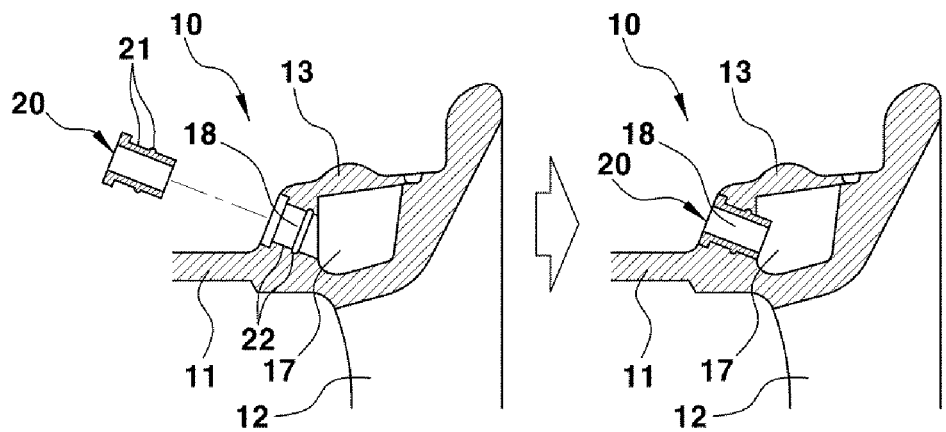
- UNDERCUT FITTING -
[FIG. 6]
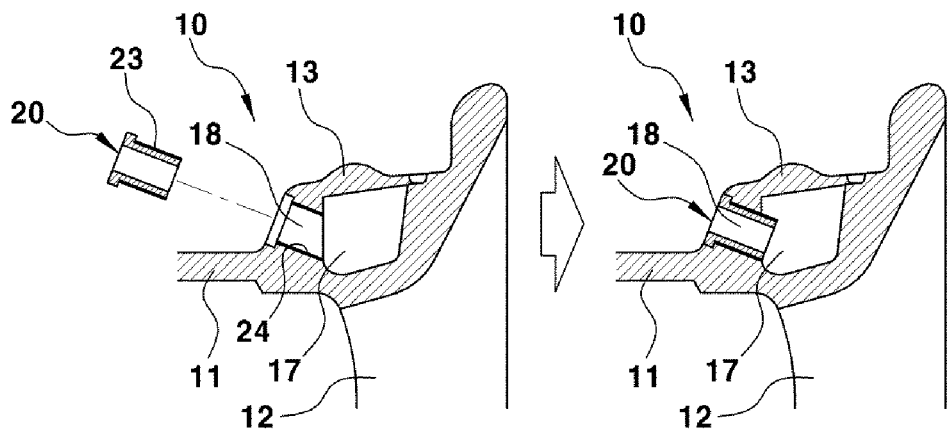
- SCREW COUPLING -

[FIG. 7A]
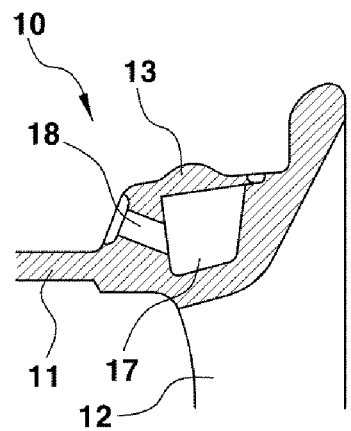
[ WHEN FORMING ONLY SOUND
-ABSORBING HOLE ]
( PRIOR ART )
[FIG. 7B]
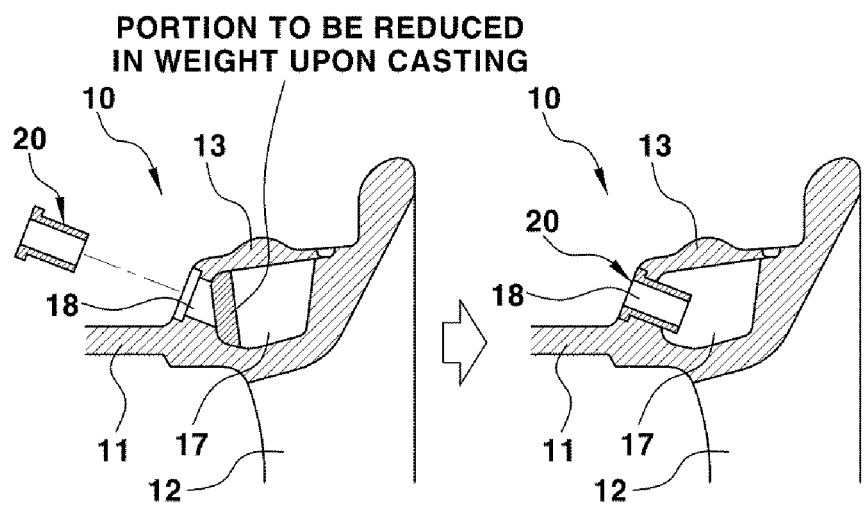
[ WHEN INSERTING INSERT NECK ]

VEHICLE WHEEL HAVING ADJUSTABLE INSERT NECK AND METHOD FOR MANUFACTURING THE SAME

CROSS-REFERENCE TO RELATED APPLICATION

This application is a divisional patent application of U.S. patent application Ser. No. 17/038,668, filed on Sep. 30, 2020, which claims the benefit of priority to Korean Patent Application No. 10-2020-0065276 filed on May 29, 2020, the entire contents of which are incorporated herein by reference.

TECHNICAL FIELD

The present disclosure relates to a vehicle wheel and a method for manufacturing the same, and more specifically, to a vehicle wheel and a method for manufacturing the same, which may easily machine a hollow resonance chamber, a sound-absorbing hole, and the like after casting a wheel in a one-piece state.

BACKGROUND

Road noise during traveling of a vehicle may include resonance sound, booming sound, rumble sound, and the like, and among them, the resonance sound refers to noise which is introduced into the interior through ground, tires, tires-mounted wheels, wheels-mounted chassis parts, and the like.

The wheel, which is also referred to as a road wheel, includes a hollow rim part on which the tire is mounted, and a disc having a spoke which is separately attached or integrally formed to an outer opening of the rim part. The rim part is applied with various sound-absorbing structures for removing resonance sound.

As an example of the related art for removing the resonance sound, a method for manufacturing the wheel in a two-piece bonding manner is applied to form a resonance chamber on a vehicle wheel.

The method for manufacturing the wheel in the two-piece bonding manner performs a process of manufacturing a rim part and a disk separately, a process of integrating the rim part and the disk forming two pieces by friction stir welding, and the like, and the resonance chamber is formed in the boundary between the rim part and the disk of the manufactured wheel.

Accordingly, the resonance sound introduced into the ground and the tire may be absorbed into the resonance chamber of the wheel manufactured in the two-piece bonding manner, thereby efficiently reducing the road noise introduced into the interior.

However, the conventional method for manufacturing the wheel in the two-piece bonding manner has a disadvantage in that the rim part and the disc are separately manufactured and then bonded to each other by friction stir welding, thereby increasing the manufacturing cost or the like due to an increase in the number of manufacturing processes and an increase in the area required by the friction stir welding.

Accordingly, as another example of the related art, a method for performing a process of forming a resonance chamber after casting a rim and a disc configuring a vehicle wheel in one-piece state is applied, but there are disadvantages in that a dimensional error occurs during the process of machining the resonance chamber, and a target resonance frequency for absorbing the resonance sound may not be adjusted.

The above information disclosed in this Background section is only for enhancement of understanding of the background of the disclosure and accordingly it may contain information that does not form the prior art that is already known in this country to a person of ordinary skill in the art.

SUMMARY OF THE DISCLOSURE

The present disclosure is intended to solve the above problems, and an object of the present disclosure is to provide a vehicle wheel and a method for manufacturing the same, which may form a temporary flange for chucking for machining a resonance chamber after casting a rim part and a disk configuring a vehicle wheel in a one-piece state, so that a flow forming process, a friction stir welding (FSVV) process, and the like may be stably performed, thereby reducing a dimensional error during the machining process, and particularly, may insert and fasten an insert neck having the adjusted inner diameter and length into and to a sound-absorbing hole communicating with the resonance chamber, thereby easily adjusting a target resonance frequency for absorbing the resonance sound while reducing the weight of the wheel.

According to an aspect of the present disclosure, a method for manufacturing a vehicle wheel includes: a casting process of forming a one-piece body according to a predetermined shape, the one-piece body having a forming end and a temporary flange integrally formed at inner and outer sides of the wheel, respectively, at a boundary between a rim part and a disc of the wheel, and a resonance chamber forming groove defined between the forming end and the temporary flange; a primary shape machining process of machining a stepped part at an outer circumferential side of the resonance chamber forming groove while machining the temporary flange in a shape which may be chucked; a flow forming process of bending the forming end to be seated on the stepped part so that the resonance chamber forming groove is in the closed resonance chamber; a friction stir welding process of integrally bonding a portion where the forming end and the stepped part are in close contact with each other so that the resonance chamber becomes a closed space; a fine machining process of removing the temporary flange; and a sound-absorbing hole machining process of forming a sound-absorbing hole for communicating between the resonance chamber and an interior space of a tire in the forming end.

In the flow forming process, by disposing and moving an angle of a mandrel roller for flow forming to be inclined toward a direction in which the forming end is bent to the stepped part, the forming end is bent and the end of the forming end is in close contact with the stepped part.

The secondary shape machining process is further performed to machine a portion where the forming end is in close contact with the stepped part in a shape accessible to a welding tool for friction stir welding before the friction stir welding process.

In the fine machining process, the outer surface of the forming end and the outer surface on which the temporary flange is removed are machined according to the predetermined shape.

The rim part and the temporary flange are chucked and fixed to a chucking die in the primary shape machining process, the flow forming process, and the friction stir welding process.

A process may be further performed to insert and fasten a hollow insert neck having adjusted inner diameter and length into and to the sound-absorbing hole according to a target resonance frequency.

The process of inserting and fastening the insert neck may be performed in a process of manufacturing the insert neck in a hollow structure having a straight tube shape to be inserted into and fastened to the sound-absorbing hole in a forcibly fitting manner, or applying a bonding material on the surface of the insert neck to insert and fasten the insert neck into and to the sound-absorbing hole.

The process of inserting and fastening the insert neck may be performed in a process of manufacturing the insert neck in a tapered hollow structure to be press-fitted and fastened to the sound-absorbing hole in the forcibly fitting manner.

The process of inserting and fastening the insert neck may be performed in a process of forming a first uneven part on the circumferential portion of the insert neck by undercut machining, and machining a second uneven part on the inner diameter portion of the sound-absorbing hole to form the first uneven part and the second uneven part to be engaged with and locked to each other while press-fitting the insert neck into the sound-absorbing hole.

The process of inserting and fastening the insert neck may be performed by forming a male screw part on the circumferential portion of the insert neck and forming a female screw part on the inner diameter portion of the sound-absorbing hole to screw-fasten the insert neck to the sound-absorbing hole.

According to another aspect of the present disclosure, a vehicle wheel may be manufactured according to the above method.

According to still another aspect of the present disclosure, a vehicle wheel includes: a rim part and a disc which are molded in a one-piece body; a resonance chamber defined at a boundary between the rim part and the disc; a forming end configured to enclose the resonance chamber; and a sound-absorbing hole defined in the forming end such that the resonance chamber and an interior space of a tire communicate with each other through the sound-absorbing hole, wherein a hollow insert neck having an inner diameter and a length adjustable according to a target resonance frequency is tightly disposed in the sound-absorbing hole.

The present disclosure provides the following effects through the aforementioned configuration.

First, by forming the temporary flange for chucking for machining the resonance chamber after casting the rim part and the disc configuring the vehicle wheel in the one-piece state to easily fix the wheel to the chucking die by the temporary flange, it is possible to stably perform the flow forming process and the friction stir welding process which are post-processes, thereby reducing the dimensional error during the machining process.

Second, by performing the fine machining process of removing the temporary flange after the friction stir welding process, it is possible to easily remove the unnecessary temporary flange.

Third, by further inserting and fastening the insert neck having the selected and adjusted inner diameter and length into and to the sound-absorbing hole as necessary after performing the process of machining the sound-absorbing hole communicating with the resonance chamber after the fine machining process, it is possible to easily adjust the target resonance frequency for absorbing the resonance sound.

Fourth, by reducing the weight of metal of the periphery where the sound-absorbing hole is formed during the casting process, it is possible to achieve the reduction in the weight of the wheel, and to easily secure the minimum length of the sound-absorbing hole by the hollow-shaped insert neck inserted into and fastened to the sound-absorbing hole even if the minimum length of the sound-absorbing hole is not secured due to the reduction in the weight of the metal.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed infra.

BRIEF DESCRIPTION OF THE DRAWINGS

The above and other features of the present disclosure will now be described in detail with reference to certain exemplary Examples thereof illustrated in the accompanying drawings which are given herein below by way of illustration only, and thus are not limitative of the present disclosure, and wherein:

FIGS. 1A to 1G are enlarged cross-sectional diagrams of main portions sequentially illustrating a process of manufacturing a vehicle wheel according to an exemplary embodiment of the present disclosure.

FIG. 2 is an enlarged cross-sectional diagram of the main portions illustrating a flow forming process among the process of manufacturing the vehicle wheel according to an exemplary embodiment of the present disclosure.

FIGS. 3 to 6 are enlarged cross-sectional diagrams of the main portions illustrating a method for fastening an insert neck into a sound-absorbing hole in the process of manufacturing the vehicle wheel according to an exemplary embodiment of the present disclosure.

FIGS. 7A and 7B are enlarged cross-sectional diagrams of the main portions illustrating a comparison between a structure in which only a conventional sound-absorbing hole is formed and a principle in which the weight of metal around the sound-absorbing hole is reduced by fastening the insert neck to the sound-absorbing hole of the vehicle wheel according to an exemplary embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, exemplary embodiments of the present disclosure will be described in detail with reference to the accompanying drawings.

FIGS. 1A to 1G are enlarged cross-sectional diagrams of main portions sequentially illustrating a process of manufacturing a vehicle wheel according to an exemplary embodiment the present disclosure.

As illustrated in FIG. 1A, a vehicle wheel 10, which can be manufactured through a casting process according to a predetermined design shape, has a one-piece structure in which a hollow-shaped rim part 11 where tires are mounted and a disc 12 having a spoke are integrated is manufactured through the casting process.

In addition, when the wheel 10 having the one-piece structure is manufactured through the casting process, a forming end 13 for forming a resonance chamber is integrally formed to protrude from the inner location of the wheel 10 at the boundary between the rim part 11 and the disc 12, a temporary flange 15 to be removed later is integrally formed at the outer location of the wheel 10 at the boundary between the rim part 11 and the disc 12, a resonance chamber forming groove 14 having predetermined width and length is formed between the forming end 13 and the temporary flange 15.

The temporary flange 15 becomes a portion chucked in a chucking die, in other words, the temporary flange 15 becomes a portion clamped to be fixed, when a primary shape machining process, a flow forming process, a secondary shape machining process, a friction stir welding process, and the like for forming the resonance chamber are performed.

Subsequently, as illustrated in FIG. 1B, the primary shape machining process is performed to process the shape for forming the resonance chamber while smoothly machining the surfaces of the forming end 13 and the temporary flange 15, and the surface of the resonance chamber forming groove 14.

At this time, the primary shape machining is performed by a known machining tool 36.

Particularly, based on the primary shape machining process, a stepped part 16 is formed so that the forming end 13 is bent and seated at the outer circumferential location of the resonance chamber forming groove 14 by the flow forming process, and the surface of the temporary flange 15 is processed while being easily chucked to the chucking die 30.

Next, as illustrated in FIG. 10, the flow forming process is performed in which the forming end 13 is bent outward so that the end of the forming end 13 is seated on the stepped part 16.

To this end, as illustrated in FIG. 2, by chucking the disc 12 and the temporary flange 15 to the chucking die 30 and then disposing and moving an angle of a mandrel roller 32 to be inclined toward a forming direction of the forming end 13, that is, a direction in which the forming end 13 is bent to the stepped part 16, the forming end 13 is bent and the end thereof becomes a state of being in close contact with the stepped part 16.

Accordingly, as the forming end 13 is in close contact with the stepped part 16, the resonance chamber forming groove 14 is formed as a resonance chamber 17 closed by the forming end 13.

As the temporary flange 15 is chucked to a chucking die 30 and is supported in contact therewith, scratch or damage may occur, but since the temporary flange 15 is removed later as an unnecessary part of the wheel, it does not matter if scratch or damage occurs, and the temporary flange 15 makes it possible to stably perform the flow forming process and the friction stir welding process by maintaining the state of being chucked and supported by the chucking die 30 until being removed.

For reference, since the resonance chamber 17 may be divided and formed in plural along the circumferential direction of the wheel, a partition wall may be formed between the respective resonance chambers 17 as indicated by reference numeral 19 in FIGS. 1A and 10.

Next, as illustrated in FIG. 1D, the secondary shape machining process is performed to process a portion where the forming end 13 is in close contact with the stepped part 16 into a shape accessible to a welding tool for the friction stir welding. That is, the secondary shape machining process is performed so that the outer surface of the forming end 13 which is in close contact with the stepped part 16 and the surface of the temporary flange 15 have the shapes easily accessible by a welding tool 34 for the friction stir welding (see FIG. 1E).

Accordingly, through the second shape machining process, the portion where the forming end 13 is bent and the end thereof is in close contact with the stepped part 16 may be easily accessible to the welding tool 34 for the friction stir welding Subsequently, the friction stir welding process is performed to integrally bond the portion where the forming end 13 and the stepped part 16 are in close contact with each other.

As described above, since the forming end 13 is bent and the end thereof is only in close contact with the stepped part 16 and is not bonded thereto, the portion where the end of the forming end 13 and the stepped part 16 are in close contact with each other is friction-stirred and welded by the welding tool 34 for forming the resonance chamber 17 as the completely closed space.

Accordingly, the end of the forming end 13 and the stepped part 16 are integrally bonded to each other by the friction stir welding process, so that the resonance chamber 17 becomes the completely closed space.

Next, as illustrated in FIG. 1F, the fine machining process for removing the temporary flange 15 is performed.

As described above, since the temporary flange 15 is only the portion which is chucked to the chucking die, when the primary shape machining process, the flow forming process, the secondary shape machining process, the friction stir welding process, and the like are performed for forming the resonance chamber and is not a substantial configuration of the wheel, the temporary flange 15 is finely processed and removed by a known fine machining tool.

In addition, the outer surface of the forming end 13 and the outer surface on which the temporary flange 15 is removed are surface-processed by the fine machining tool according the designed shape.

Next, as illustrated in FIG. 1G, a sound-absorbing hole machining process is performed to form a sound-absorbing hole 18 for communicating between the resonance chamber 17 and the interior space of the tire in the forming end 13.

The sound-absorbing hole 18 may be formed through the inner end of the forming end 13 so as to communicate with the inner space (air filling space) of the tire mounted to the rim 11.

Accordingly, when the noise from the road surface during traveling of the vehicle passes through the sound-absorbing hole 18 through the tire and is introduced into the resonance chamber 17, the phase shift for a specific frequency of noise may occur in the resonance chamber 17, thereby extinguishing the noise.

According to the present disclosure, after the sound-absorbing hole machining process, a process of inserting and fastening a separate insert neck 20 having a hollow bush shape into and to the sound-absorbing hole 18 may be further performed (see FIG. 3).

More specifically, after the process of machining the sound-absorbing hole 18 communicating with the resonance chamber 17, a process of further inserting and fastening the insert neck 20 having the selected and adjusted inner diameter and length into and to the sound-absorbing hole 18 may be further performed as necessary.

As a result, it is possible to easily adjust the target resonance frequency for absorbing the resonance sound by the insert neck 20, and in addition, by inserting and fastening the insert neck 20 into and to the sound-absorbing hole 18, it is possible to reduce the thickness of the metal around the sound-absorbing hole 18 to reduce the weight of the wheel.

The method for inserting and fastening the insert neck 20 into and to the sound-absorbing hole 18 will be described with reference to FIGS. 3 to 6 as follows.

The insert neck 20 is provided by machining and adjusting the inner diameter and length of the insert neck 20 in advance according to the target resonance frequency for absorbing the resonance sound.

That is, the insert neck 20 is manufactured by adjusting the inner diameter and the length thereof in advance according to different target resonance frequencies for absorbing the resonance sound, that is, different target resonance frequencies for each vehicle model or wheel type.

In addition, the insert neck 2 may be manufactured in the previously standardized dimension in the inner diameter and length to be inserted into and fastened to the sound-absorbing hole 18, thereby preventing a conventional dimensional error when the sound-absorbing hole 18 is processed.

As illustrated in FIG. 3, a first fastening method of the insert neck 20 thus provided may provide the insert neck 20 in a hollow structure having a straight tube shape to be inserted into and fastened to the sound-absorbing hole 18 in a forcibly fitting method, and alternatively, may apply a bonding material to the surface of the insert neck 20 to insert and fasten the insert neck into and to the sound-absorbing hole 18.

As illustrated in FIG. 4, a second fastening method of the insert neck 20 may manufacture the insert neck 20 in a tapered hollow structure to be more easily press-fitted and fastened to a sound-absorbing hole 18 than a forcibly fitting method.

As illustrated in FIG. 5, a third fastening method of the insert neck 20 may manufacture the insert neck 20 in a structure in which a first uneven part 21 is formed on the circumference thereof by undercut machining, and also process a second uneven part 22 on the inner diameter portion of the sound-absorbing hole 18, and then hit the insert neck 20 to be press-fitted into the sound-absorbing hole 18, so that the first uneven part 21 and the second uneven part 22 may be engaged with and locked to each other, thereby firmly inserting and fixing the insert neck 20 into and to the sound-absorbing hole 18.

As illustrated in FIG. 6, a fourth fastening method of the insert neck 20 may manufacture the insert neck 20 in a structure in which a male screw part 23 is formed on the circumferential portion by screw machining, form a female screw part 24 on the inner diameter portion of the sound-absorbing hole 18 by the screw machining, and then screw-fasten the insert neck 20 into the sound-absorbing hole 18, thereby firmly inserting and fixing the insert neck 20 into and to the sound-absorbing hole 18.

Accordingly, when the noise from the road surface during traveling of the vehicle is absorbed while passing through the insert neck 20 through the tire and at the same time, is introduced into the resonance chamber 17, the phase shift for a specific frequency of noise may occur in the resonance chamber 17, thereby extinguishing the noise.

Moreover, since the inner diameter and length of the insert neck 20 have been adjusted according to the target resonance frequency, the noise of a target resonance frequency band through the tire from the road surface may pass through the insert neck 20 and be introduced into the resonance chamber 17 to be easily extinguished, thereby improving the road noise to achieve interior quietness and the improvement in the ride comfort.

Further, by inserting and fastening the insert neck 20 into and to the sound-absorbing hole 18 as described above, it is possible to reduce the thickness of the metal corresponding to the periphery of the sound-absorbing hole 18 (longitudinally around the sound-absorbing hole) to reduce the weight of the metal, thereby reducing the weight of the wheel.

More specifically, since the minimum length of the sound-absorbing hole 18 needs to be secured for introducing the noise in the target resonance frequency band into the resonance chamber, as illustrated in FIG. 7A, the thickness of the metal along the longitudinal direction of the sound-absorbing hole 18 is inevitably increased, but like the region indicated as "the portion to be reduced in weight upon casting" in FIG. 7B during the casting process according to the present disclosure, by reducing the thickness of the metal along the longitudinal direction of the sound-absorbing hole 18, it is possible to reduce the weight of the wheel.

Particularly, although the minimum length of the sound-absorbing hole 18 is not secured by reducing the thickness of the metal along the longitudinal direction of the sound-absorbing hole 18, by separately inserting the hollow-shaped insert neck into the sound-absorbing hole 18, the length of the hollow hole of the insert neck may satisfy the minimum length of the sound-absorbing hole, and accordingly, the noise in the target resonance frequency band may be easily introduced into the resonance chamber 17 through the hollow hole of the insert neck 20.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle wheel comprising:
    a rim and a disc which are molded in a one-piece body;
    a resonance chamber defined at a boundary between the rim and the disc;
    a forming end configured to enclose the resonance chamber; and
    a sound-absorbing hole defined in the forming end such that the resonance chamber and an interior space of a tire communicate with each other through the sound-absorbing hole,
    wherein a hollow insert neck having an inner diameter and a length adjustable according to a target resonance frequency is tightly disposed in the sound-absorbing hole,
    wherein the insert neck includes a first uneven part on a circumferential portion thereof and the sound-absorbing hole includes a second uneven part on an inner diameter portion thereof such that the first uneven part and the second uneven part are engaged and locked to each other, wherein the first uneven part includes a first groove and a first protrusion, and the second uneven part includes a second protrusion and a second groove, and wherein when the insert neck is press-fitted into the sound-absorbing hole, the first protrusion of the first uneven part is inserted and fastened to the second groove of the second uneven part, and the second protrusion of the second uneven part is inserted and fastened to the first groove of the first uneven part.

2. A vehicle wheel comprising:

a rim and a disc which are separately molded to be coupled to each other;

a resonance chamber defined at a boundary between the rim and the disc;

a forming end configured to enclose the resonance chamber; and a sound-absorbing hole defined in the forming end such that the resonance chamber and an interior space of a tire communicate with each other through the sound-absorbing hole, wherein a hollow insert neck having an inner diameter and a length adjustable according to a target resonance frequency is tightly disposed in the sound-absorbing hole, wherein the insert neck includes a first uneven part on a circumferential portion thereof and the sound-absorbing hole includes a second uneven part on an inner diameter portion thereof such that the first uneven part and the second uneven part are engaged and locked to each other, wherein the first uneven part includes a first groove and a first protrusion, and the second uneven part includes a second protrusion and a second groove, and wherein when the insert neck is press-fitted into the sound-absorbing hole, the first protrusion of the first uneven part is inserted and fastened to the second groove of the second uneven part, and the second protrusion of the second uneven part is inserted and fastened to the first groove of the first uneven part.

* * * * *